(12) United States Patent
Knappmiller

(10) Patent No.: US 7,810,845 B2
(45) Date of Patent: Oct. 12, 2010

(54) PIPE THREAD SEALANT SHEATH

(76) Inventor: Leonard V. Knappmiller, P.O. Box 136, Center Rutland, VT (US) 05736

( * ) Notice: Subject to any disclaimer, the term of this patent is extended or adjusted under 35 U.S.C. 154(b) by 603 days.

(21) Appl. No.: 11/582,785

(22) Filed: Oct. 18, 2006

(65) Prior Publication Data
US 2008/0136164 A1 Jun. 12, 2008

(51) Int. Cl.
F16L 35/00 (2006.01)
(52) U.S. Cl. .................... 285/18; 138/96 R
(58) Field of Classification Search ........... 285/293.1; 138/96 R, 96 T; 128/842, 844; 600/38, 39, 600/41
See application file for complete search history.

(56) References Cited

U.S. PATENT DOCUMENTS

| | | | | |
|---|---|---|---|---|
| 2,145,705 A * | 1/1939 | Wodtke | ................ | 138/96 R |
| 2,992,457 A * | 7/1961 | Harrison | ................ | 285/293.1 |
| 3,992,570 A * | 11/1976 | Beinhaur | ................ | 138/96 R |
| 4,553,567 A * | 11/1985 | Telander | ................ | 138/96 T |
| 4,733,888 A * | 3/1988 | Toelke | ................ | 138/96 T |
| 5,498,310 A * | 3/1996 | Nishizono | ................ | 128/844 |
| 5,806,524 A * | 9/1998 | Hernandez | ................ | 128/844 |
| 6,254,948 B1 * | 7/2001 | Hellmig | ................ | 428/36.9 |
| 6,474,411 B1 * | 11/2002 | Carrano Castro | ................ | 166/77.51 |
| 6,502,604 B1 * | 1/2003 | Lewis | ................ | 138/96 R |
| 6,527,301 B1 * | 3/2003 | Bathey | ................ | 138/96 T |
| 6,718,983 B1 * | 4/2004 | Suzuki | ................ | 128/844 |
| 6,935,380 B2 * | 8/2005 | Rahimzadeh et al. | ................ | 138/96 R |
| 2005/0155659 A1 * | 7/2005 | Rahimzadeh et al. | ................ | 138/96 R |
| 2007/0236004 A1 * | 10/2007 | Benedict | ................ | 285/45 |

* cited by examiner

*Primary Examiner*—Aaron Dunwoody
(74) *Attorney, Agent, or Firm*—Kevin Ellicott, Esq

(57) ABSTRACT

A pipe thread sealant sheath for producing a seal at a junction between a male threaded pipe and a female threaded pipe once the pipe thread sealant sheath covered male threaded pipe is interthreaded into the female threaded pipe comprising a hollow body having an open and a spaced apart and opposite closed end, the pipe thread sealant sheath having thickness sized for remaining intact while being applied to a male threaded pipe and having the closed end easily breached once the pipe sealant sheath has been applied to the male threaded pipe, the pipe thread sealant sheath being rolled upon itself prior to being applied to the male threaded pipe.

1 Claim, 2 Drawing Sheets

PIPE THREAD SEALANT SHEATH

CROSS REFERENCE TO OTHER APPLICATIONS

This is the first submission of an application for this article of manufacture. There are no other applications, provisional or non provisional.

FEDERALLY SPONSORED RESEARCH AND DEVELOPMENT

There are no federally sponsored or funded research or development projects or undertakings in any way associated with the instant invention.

BACKGROUND OF THE INVENTION

1. Field of the Invention

The instant invention relates to that field of devices consisting of articles of manufacture known as sealants for use on pipe threads. Specifically, the instant invention is a single application pipe thread sealant for use on joints between interfitting male and female coaxial components.

2. Background Information

The prior art known to the Inventor discloses two principal forms of pipe thread sealants. The first, generally known as "liquid sealant" is in liquid form or occasionally a paste or gel. It is applied to the male threads of a typical male female union found commonly as connection means between two pieces of plastic, copper, brass, steel or iron pipe. More often than not, the applicator is a brush, though it is also known to be tip of the container in which the sealant is packaged. Liquid sealant is packaged such that multiple applications are in each container.

The second form of pipe sealant is the solid type, most often available as a roll of "tape". In this form, the sealing material is fabricated into a very long strip, which is then rolled onto itself and packaged. When packaged, the roll of tape provides multiple applications in each container.

The instant invention is preferably fabricated from the same sort of material generally available as a solid pipe sealant. One of the most common names for this sort of material, and the name by which it is generally known in the art of plumbing is "Teflon tape". Teflon is a registered trademark of E.I. du Pont de Nemours and Company. Generally, this sort of tape is actually a form of PTFE (polytetraflouroethylene) flouropolymer resin.

Under normal circumstances, a pair of male-female pipes which are to be connected together are prepared by applying pipe sealant to the male-threaded portion of the pipe, and then turning or twisting (rotating) the pipes together such that the male-threaded portion of the pipe threads and seats into the female-threaded portion of another pipe. Once fully tightened, the combination of the interlocking male-female threaded portions of the pipes and the pipe sealant provide a firm seal such that material (generally in a gaseous or liquid form) passing through the two connected pipes will not leak out of the two pipes, at the male-female joint.

As noted above, it is generally the accepted practice to apply the sealant to the male-threaded portion of the pipes to be connected, prior to attaching the two pieces of pipe together. Under ideal circumstances, the two pieces of pipes to be connected to one another are easily accessible, and the male-threaded portion is not attached to anything. Under these circumstances, one may manipulate the pipe having the male-threaded portion easily and turn the pipe or otherwise move it during the process of applying the sealant. For example, when the pipe having the male-threaded portion is not attached to anything, one can hold it under one's arm, or lay it on a stable, horizontal surface. One can then use both of one's hands to press a sealant tape firmly onto the male-threaded end of the pipe and carefully wind the tape around the pipe, repeatedly, thereby "coating" the male-threaded portion of the pipe with the tape. It is well known that one must use a considerable degree of care when applying the sealant tape, to ensure that the tape overlaps itself somewhat during the application (thus ensuring a complete coating on the pipe threads). It is also well known that one must have enough space around the male-threaded end of the pipe so that the tape can be carefully wrapped around the threads without bunching up on itself or otherwise become stuck to itself.

Current solid pipe sealants, like the "Teflon tape" referred to above tend to be difficult to work with when connecting two pipes together under less than ideal circumstances. For example, should it be necessary to connect a pair of male-female threaded pipes within a confined area, it takes at least one pair of hands to hold the tape and wrap or wind it around the male threaded portion of the pipe repeatedly in order to form a complete seal along the male threaded portion.

An example of such a confined area would be the interior of a standard two-by-four studded wall covered with sheet rock. Should it be necessary at a later date to replace a portion of the male-female threaded pipe located within the wall, the sheet rock must be cut away in an area in order to expose the pipe joint. Such a cutaway is generally preferred to be as small as possible, to minimize the amount of repair work which must be done in order to put the wall back to its original condition. However, because the cutaway tends to be as small as possible, very little room is available to reach inside the wall with both hands at the same time, and wind or wrap the sealant tape around the pipe joint before reconnecting the male-female threaded portions back together.

In such a circumstance, the current art of pipe sealants requires that the opening be large enough for one to get a pair of hands inside the opening, at the same time, in order to hold the sealant tape firmly with one hand, and then begin to roll or wind around the male-threaded end of one pipe prior to re-seating it into the female-threaded end of the other pipe. However, making the opening in the wall large enough for the pair of hands results in damage to the wall far larger than would be required if only one hand was required to apply the pipe sealant.

This process of winding or wrapping the sealant tape around the male-threaded portion of the pipe can be further complicated when the pipe has been located within a confined space, proximate to a back wall or other pipe so that there is practically no room at all to wrap the tape (that is, revolving the tape around the pipe in the same fashion the Earth revolves around the Sun) repeatedly around the pipe. The art currently dispenses these sealant tapes in a roll, and in order to wrap the pipe in such a circumstance it becomes necessary to un-roll a length of the tape, and then carefully thread the loose piece of tape between the proximate object and the pipe portion to be sealed, repeatedly. Applying the sealant tape in this manner introduces the very real possibility of contaminants becoming attached to the sealant tape before it is applied to the male threads, and then being wrapped onto the threads. Such a contaminated pipe thread is often very difficult to seat firmly into the female-threaded portion of the pipe, and can well serve as a weakened area which may give way under the pressure of the material flowing through the pipe and result in the material flowing through the pipe leaking out along the pipe joint.

It is further well known that unless one is very careful when applying the sealant tape, one may drop the tape dispenser from one's hand. This then leads to the dispenser falling to the ground or floor under the force of gravity, and a length of sealant tape becoming unrolled and potentially useless due to contamination. At the very least, the user is left with the task of re-rolling the tape back into the dispenser, wasting valuable time and energy.

It is also generally known that when applying sealant tape to a threaded pipe, the sealant tape should be wound onto the pipe threads in the opposite direction of that which the pipe itself will be turned when seating the male threaded pipe into the female threaded pipe. This is done to ensure that the sealant tape will be less likely to unwind from the male threaded pipe as the male threaded pipe is seating into the female threaded pipe. Unfortunately, those who are unfamiliar with the proper application may be unaware of the preferred direction, and thus apply the sealant tape incorrectly, leading to incomplete seals and sealant tape unwinding during the connecting of one pipe into another.

Those who deal in the art of connected threaded pipes with sealant on the joint between them further recognize that it is useful to include a visual indicia of the presence of the pipe sealant. When using a solid type pipe sealant, this is most often accomplished by winding the sealant tape around the pipe, beyond the male-threaded portion, such that after the two pieces of pipe have been threadably interlocked, at least a portion of the sealant tape will still be visible to the naked eye. Unfortunately, it is difficult to know exactly how far to apply the tape in advance, as the male-threaded portion of the pipe may seat further into the threaded portion of the other pipe than one might estimate. And if an insufficient amount of sealant tape is wrapped around the male-threaded portion of the pipe, once that pipe is fully seated it may be impossible to see the sealant tape and know that the two pipes have been properly sealed at their threaded joint.

Finally, it is well known that while one should apply the sealant tape such that it overlaps itself somewhat with each revolution around the male-threaded portion of the pipe, one must also exercise caution not to repeatedly wrap the same portion of the threads too many times. Such an over-application results in the outer diameter of the male-threaded portion plus pipe sealant being too great to easily be threaded (rotated) into, and seated within the female-threaded portion of the pipe. That is, applying too much sealant tape to the threads can make it nearly impossible to firmly and properly seat one pipe into another, as the inner diameter of the female-threaded portion of pipe will not be great enough to accept the outer diameter of the male-threaded portion plus sealant tape.

And while the state of the art has thus far been discussed in terms of the solid pipe sealant, liquids and pastes have their own disadvantages that will briefly be discussed.

Like the solid sealants, the liquid form must be applied evenly to the threads of the pipe prior to joining them together. Unfortunately, where the pipes are not easily accessible, it is just as difficult to reach some portions of the threaded pipe with a brush or applicator as it is to wind a solid sealant tape around the male-threaded portion of the pipe. Areas of the threads which cannot be seen during the application may be missed, and an inadequate seal thereby formed.

Furthermore, many jobs require that as little "mess" be made as possible. When using liquid or paste type pipe joint sealants, it is common for the sealant material to "drip" or "splatter" and contaminate near by surfaces and objects. This accidental application of the liquid sealant results in additional cleaning being required at the completion of the job at hand, thus consuming time that would be better spent on other tasks.

The state of the art then, is that there are a number of materials available to properly seal the joint between two threaded pipes. However, none of them have been fabricated in a manner which would make their application to the pipe threads faster, easier or cleaner.

SUMMARY OF THE INVENTION

The instant invention is a threaded pipe sealant of the solid sort fabricated in the form of a single application rolled seal. For the first time, it is possible to easily apply a seal to a threaded pipe with one hand, and do so in confined areas without the likelihood of under-applying or over-applying said sealant.

A first object of the instant invention, therefore, is to provide for a solid type threaded pipe sealant which may easily be applied with one hand.

This objective is accomplished by fabricating a sheath having an open end and a closed end, and rolling the sheath upon itself to create a "ring" which may easily be fitted over the male-threaded portion of a pipe, and then unrolled, axially, onto the pipe threads using only one hand.

A second object of the instant invention is to provide for a solid type threaded pipe sealant which may easily be applied to the male-threaded portion of a pipe even when the pipe is in a confined space or very proximate to another object such as a wall or nearby pipe or other obstruction.

This objective is accomplished by fabricating a sheath having an open end and a closed end, and rolling the sheath upon itself to create a "ring" which may easily be fitted over the male-threaded portion of a pipe, and then unrolled, axially, onto the pipe threads rather than requiring the tape to be repeatedly wound or revolved around the portion of the threaded pipe to be sealed.

A third objective of the instant invention is to provide for a solid type threaded pipe sealant which may will be evenly applied to the male-threaded portion of a pipe even when that male threaded portion is not entirely visible during the application process.

This objective is accomplished by fabricating a sheath having an open end and a closed end, and rolling the sheath upon itself to create a "ring" which may easily be fitted over the male-threaded portion of a pipe, and then unrolled, axially, onto the pipe threads so that the act of unrolling the sealant tape axially along the pipe automatically covers every thread of the male-threaded pipe over which the sheath is unrolled, thereby making it impossible to fail to apply the sealant to any area of the male-threaded portion of the pipe.

A fourth object of the instant invention is to provide for a solid type threaded pipe sealant which may easily be applied without the requirement that it be wound onto the male threaded portion of a pipe in the opposite direction which the male threaded pipe will be turned while connecting it to a female threaded pipe.

This objective is accomplished by fabricating a sheath having an open end and a closed end, and rolling the sheath upon itself to create a "ring" which may easily be fitted over the male-threaded portion of a pipe, and then unrolled, axially, onto the pipe threads rather than wound around the pipe.

A DESCRIPTION OF THE DRAWINGS

A DESCRIPTION OF THE PREFERRED EMBODIMENT

Figure 1:
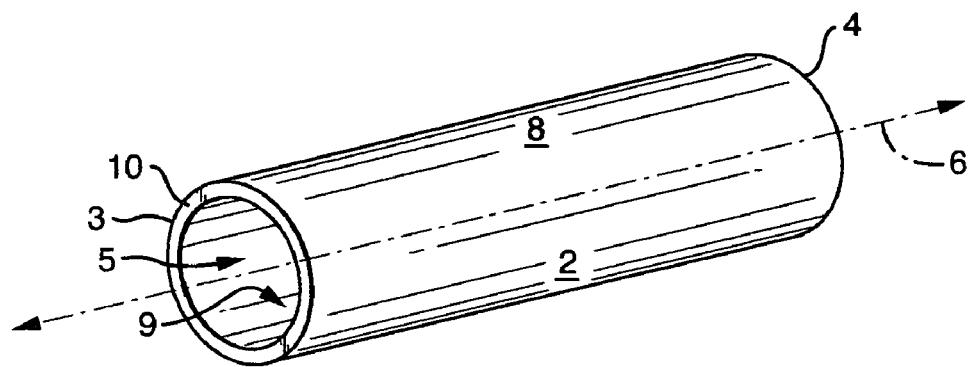
FIG. 1 is a perspective view of the preferred embodiment of the instant invention.
Figure 3:
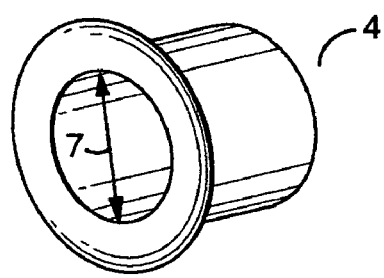
FIG. 3 is a perspective view of the preferred embodiment of the instant invention fully rolled upon itself.
Figure 4:
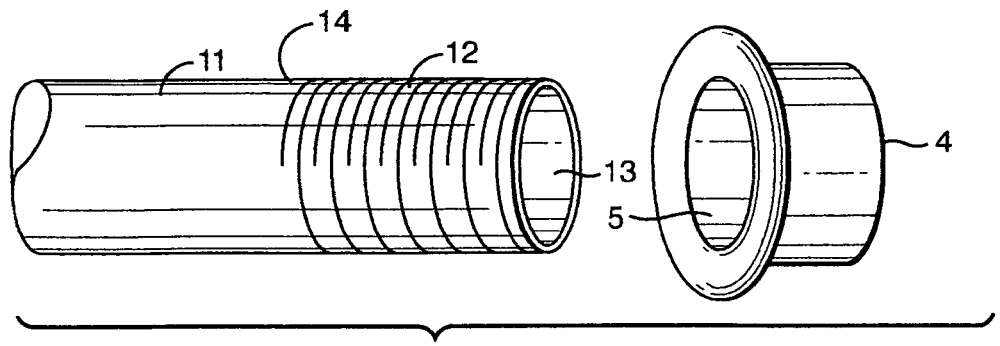
FIG. 4 is a side elevational view of a portion of a male-threaded pipe and the instant invention.
Figure 5:
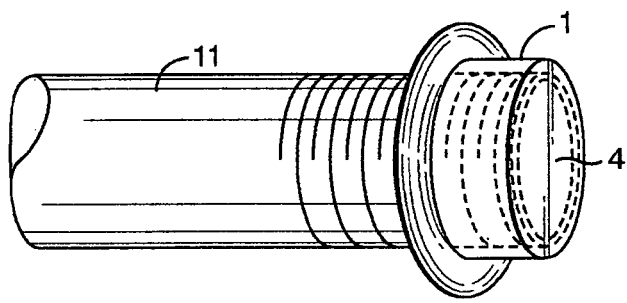
FIG. 5 is a side elevational view of a portion of a male-threaded pipe with the instant invention applied to one end of said pipe.
Figure 6:
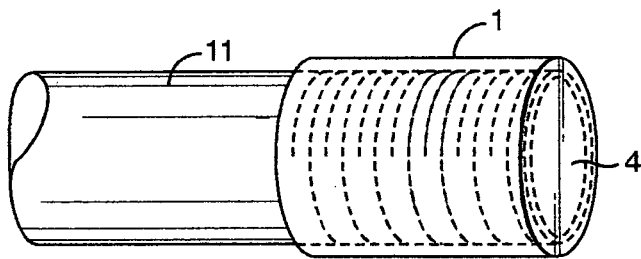
FIG. 6 is a side elevational view of a portion of a male-threaded pipe with the instant invention un-rolled so as to completely cover the pipe threads.
Figure 8:
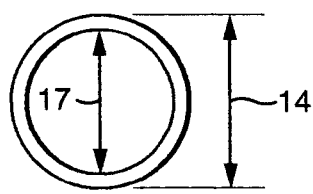
FIG. 8 is an elevational view of the opening in the male threaded pipe.

As per FIG. 1, in the preferred embodiment, a pipe sealant sheath (1) includes a generally cylindrical, hollow body (2) having a first end (3) and an opposite and spaced apart closed second end (4). In the preferred embodiment, the pipe sealant sheath is fabricated from PTFE (polytetraflouroethylene) flouropolymer resin. The hollow body (2) spans between the first end (3) and the second end (4) and may be further understood to have a hollow body continuous outer surface (8), a hollow body continuous inner surface (9) and a hollow body thickness (10). In the preferred embodiment, the first end has an opening (5) providing access to the hollow body interior. The opposite second end is closed. As per FIGS. 1 and 3, the first end opening (5) has a first end opening diameter (7). Given that the preferred embodiment of the instant invention is generally cylindrical or tubular, it should be obvious that a diameter of the hollow body interior (15) and the first end opening diameter (7) are equal to one another. That is, the instant invention is essentially a tubular body having an open end and a closed end.

As would any cylindrical or tubular body, the instant invention may be further described with reference to a first axis (6) passing axially through the hollow body (2). When fabricated, the instant invention will be a tube having an open end and a closed end. The instant invention has been described as being useful to provide a seal at the junction of a male-threaded and female-threaded pipe by being applied to the male-threaded portion.

It is therefore useful at this point, as per FIGS. 1, 3, 4, 5 and 6, to describe the instant invention in relation to the male-threaded pipe. As per FIG. 4, the male threaded pipe (11) has a threaded portion (12), the threaded portion having an opening (13) through which material passing through the pipe may exit. The male-threaded portion of the pipe further has an interior diameter (17) and an exterior diameter (14). In order for the instant invention to operate as intended by the Inventor, it is preferable for the pipe sealant sheath first end opening diameter (7) to be approximately equal to the pipe male-threaded portion interior diameter (17). Those in the art will recognize that the exterior diameter (14) of the pipe is greater than the interior diameter, so that the pipe threads may be cut into the pipe without breaching the pipe such that material passing through the pipe may escape from the pipe. It is possible to decrease the first end opening diameter (7) to somewhat less than the to the pipe male-threaded portion exterior diameter (14) so long as the material from which the instant invention is fabricated is sufficiently stretchable without tearing. And while it is possible to increase the first end opening diameter (7) so that it is somewhat greater than the to the pipe male-threaded portion exterior diameter (14), the first end opening diameter should not be so great as to cause the instant invention to bunch up or otherwise prevent the male-threaded portion of the pipe from easily threading and seating into a female threaded portion of another pipe.

It is preferred that the pipe sealant sheath first end opening diameter (7) should be somewhat greater than the pipe male-threaded portion interior diameter (17) and somewhat less than the pipe male-threaded portion exterior diameter (14) so that the pipe sealant sheath will tend to follow the contour of the threaded portion of the male-threaded pipe as the instant invention is applied to the male-threaded pipe.

In the preferred embodiment, when using a so-called one half inch inside diameter steel pipe, it is preferred for the first end opening diameter (7) to be approximately one half inch. It is further preferred that the hollow body thickness (10) of the instant invention be 1-6 mil when used in connection with a so-called one half inch diameter steel pipe. However, the hollow body thickness (10) may be varied without departing from the scope of the claims, so long as the closed end may be easily punctured, as described below. Those in the art will immediately recognize that given the various sorts of threaded pipe, and given their varying dimensions (e.g. half inch, three quarter inch, etc.) the precise dimensions of the instant invention will need to be varied according to the pipe dimensions upon which it is to be used.

Figure 2:
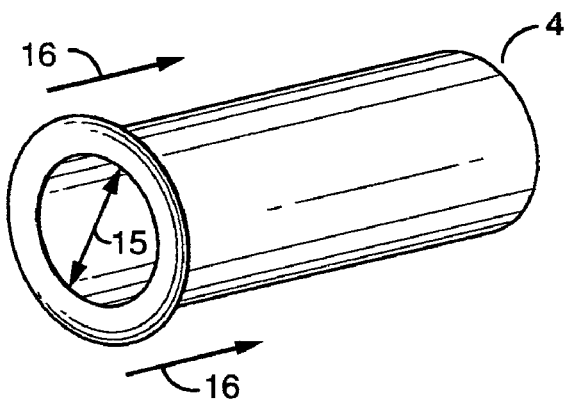
FIG. 2 is a perspective view of the instant invention as it is rolled upon itself.

It will be readily apparent to those familiar with the art, that if one were to attempt to simply slide the instant invention onto the male-threaded pipe male threaded portion (12), the threads would tend to impede the instant invention's application. It is therefore believed preferable for the instant invention to be rolled up prior to attempting to fit it onto the pipe. No new knowledge is required to perform this task, as it is well known the art of the tubular membrane prophylactics used on human males that a tube similar to the instant invention may be easily rolled upon itself, axially, starting at the first end opening (5) and rolling it towards the second closed end (4), in the direction of arrows (16) as per FIG. 2.

The operation of the instant invention may now be fully understood. As per FIGS. 3, 4, 5 and 6, once the instant invention has been rolled upon itself, it may be placed on the male-threaded pipe male threaded portion (12) so that the male threaded portion opening (13) is inserted within the first end opening (5) and therefore covered by the closed second end (4). It is then possible to unroll the instant invention once again, onto the male-threaded pipe (11), away from the male threaded portion opening (13), so that all of the male-threaded pipe male threaded portion (12) is fully covered by the pipe sealant sheath (1) while the male threaded pipe male end is threadably engaged into the female threaded pipe.

Figure 7:
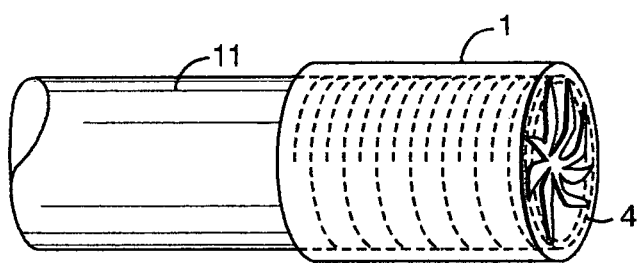
FIG. 7 is a perspective view showing the pipe fitted with the instant invention and ready for assembly into a female threaded pipe.

It will further be obvious to those familiar with the art that unless the closed second end (4) is breached, prior to assembling the male-threaded pipe into a female threaded pipe, it would be impossible for material to flow through the pipes as intended. However, if the material from which the instant invention is fabricated will tend to rupture under pressure, it may be possible to leave the closed second end (4) unbreached. In the preferred embodiment, as per FIG. 7, it is believed that the best practice is to breach the closed second end (4) prior to assembling the male-threaded pipe into the female-threaded pipe. This may be most easily accomplished once the instant invention has been applied to the male-threaded pipe by simply pushing one's finger through the closed end (4) far enough to penetrate one's finger into the male threaded portion opening (13), prior to assembling the pipes together.

It will further be recognized by those familiar with the art that as the male-threaded pipe is rotated into and seated within the female threaded pipe, that the portion of the instant invention which has not been unrolled so far as to prevent contact with the female-threaded portion of the pipe will tend to be pushed by the female-threaded portion of the pipe and either be unrolled further or stretch somewhat so that any unrolled portion is still visible on the male-threaded portion of the pipe. This unrolled portion would then serve as a visual cue to anyone who viewed it that the two pipes had been sealed to one another using the instant invention.

It should be noted that, in the event that one wishes to remove the pipe sealant sheath prior to inserting the pipe male-threaded portion into the pipe female-threaded portion, unlike liquid sealants which are ruined through the removal process and require substantial cleaning of the male-threaded portion, and, unlike solid type pipe sealants which tend to become stringy and are not reusable, it may be possible to remove the instant invention and reapply it.

Finally, while the instant invention has been described as being fabricated from PTFE (polytetraflouroethylene) flouropolymer resin, it is entirely possible that other materials having similar physical properties could be utilized instead. So long as the material maybe stretched somewhat without tearing, and so long as the material chosen will function as a thread sealant when the male threaded pipe threaded portion (12) and female threaded pipe have been interthreaded without failing and permitting the material within the pipes to leak out, the precise material chosen may be varied without departing from the scope of the claims. It may be useful, whether PTFE or another material is used, to include scoring into the surface of the closed second end (4) to increase the ease of puncturing it.

I claim:

1. A method for applying a pipe thread sealant sheath to a male threaded pipe comprising;
   A. manufacturing a pipe thread sealant sheath having a hollow body, the hollow body having a closed end and a spaced apart and opposite open end,
   B. rolling the pipe thread sealant sheath upon itself such that the pipe thread sealant sheath has an essentially ring-like form,
   C. placing the open end of the pipe thread sealant sheath over an open end of the male threaded pipe,
   D. unrolling the pipe thread sealant sheath onto the male threaded pipe such that the pipe thread sealant will remain in place as the male threaded pipe is rotated to seat into a female threaded pipe,
   E. breaching the closed end of the pipe thread sealant sheath.

* * * * *